United States Patent
Willets et al.

(10) Patent No.: US 7,557,531 B2
(45) Date of Patent: Jul. 7, 2009

(54) POWER SYSTEM UTILIZING FLOW BATTERIES

(75) Inventors: Julie A. Willets, Overland Park, KS (US); Jerry Meyers, Olathe, KS (US); Larry L. Johnson, Overland Park, KS (US)

(73) Assignee: Sprint communications Company L.P., Overland Park, KS (US)

( * ) Notice: Subject to any disclaimer, the term of this patent is extended or adjusted under 35 U.S.C. 154(b) by 440 days.

(21) Appl. No.: 11/313,142

(22) Filed: Dec. 19, 2005

(65) Prior Publication Data

US 2007/0138872 A1    Jun. 21, 2007

(51) Int. Cl.
*H01M 6/50* (2006.01)

(52) U.S. Cl. .................. 320/101; 429/72; 307/66

(58) Field of Classification Search ............. 320/101, 320/167; 307/66
See application file for complete search history.

(56) References Cited

U.S. PATENT DOCUMENTS

| | | | |
|---|---|---|---|
| 3,732,690 A | 5/1973 | Meijer | |
| 4,119,861 A | 10/1978 | Gocho | |
| 4,185,456 A | 1/1980 | Cummings | |
| 4,206,269 A | 6/1980 | Putt et al. | |
| 4,283,634 A | 8/1981 | Yannone et al. | |
| 4,598,542 A | 7/1986 | Reynolds | |
| 5,737,202 A | 4/1998 | Shimamori | |
| 5,929,538 A | 7/1999 | O'Sullivan et al. | |
| 5,959,851 A | 9/1999 | Shutts | |
| 6,011,324 A | 1/2000 | Kohlstruck et al. | |
| 6,184,593 B1 | 2/2001 | Jungreis | |
| 6,304,006 B1 | 10/2001 | Jungreis | |
| 6,380,637 B1 | 4/2002 | Hsu et al. | |
| 6,452,289 B1 | 9/2002 | Lansberry et al. | |
| 6,455,187 B1 | 9/2002 | Tomazic | |
| 6,492,047 B1 | 12/2002 | Peled et al. | |
| 6,498,462 B2 | 12/2002 | Ballantine et al. | |
| 6,516,616 B2 | 2/2003 | Carver et al. | |
| 6,522,955 B1 | 2/2003 | Colborn | |
| 6,582,842 B1 | 6/2003 | King | |
| 6,649,289 B2 | 11/2003 | Hsu et al. | |
| 6,666,123 B1 | 12/2003 | Adams et al. | |
| 6,700,214 B2 * | 3/2004 | Ulinski et al. ............. 290/40 C |
| 6,703,722 B2 | 3/2004 | Christensen | |
| 6,711,036 B2 * | 3/2004 | Winter ...................... 363/65 |
| 6,746,790 B2 | 6/2004 | Colborn | |
| 6,879,052 B1 | 4/2005 | Johnson | |
| 6,885,112 B2 | 4/2005 | Johnson | |
| 6,930,402 B1 | 8/2005 | Johnson et al. | |

(Continued)

FOREIGN PATENT DOCUMENTS

EP    0595191    5/1994

(Continued)

OTHER PUBLICATIONS

U.S. Appl. No. 10/648,973.

(Continued)

*Primary Examiner*—Adolf Berhane
*Assistant Examiner*—Yalkew Fantu

(57) ABSTRACT

The present invention is an energy generating system which uses an advanced aqueous-electrolyte energy storage system in conjunction with a commercial available primary source of power and a backup fuel cell.

19 Claims, 2 Drawing Sheets

U.S. PATENT DOCUMENTS

| | | | |
|---|---|---|---|
| 6,960,838 B2 * | 11/2005 | Johnson | 290/1 A |
| 6,992,401 B1 | 1/2006 | Johnson | |
| 2001/0009338 A1 | 7/2001 | Reutere | |
| 2002/0134544 A1 | 9/2002 | DeVilbiss et al. | |
| 2004/0094963 A1 | 5/2004 | Johnson | |
| 2004/0095022 A1 | 5/2004 | Johnson | |
| 2006/0016189 A1 | 1/2006 | Johnson | |
| 2006/0038533 A1 | 2/2006 | Johnson | |
| 2006/0066105 A1 | 3/2006 | Johnson | |
| 2006/0071476 A1 | 4/2006 | Johnson | |
| 2006/0076831 A1 | 4/2006 | Meyers | |

FOREIGN PATENT DOCUMENTS

| | | |
|---|---|---|
| EP | 0718904 | 6/1996 |
| WO | 9932762 | 7/1999 |
| WO | 02087742 | 11/2002 |
| WO | 2004-047250 | 6/2004 |
| WO | 2004047206 | 6/2004 |
| WO | 2004047262 | 6/2004 |
| WO | 2004105212 | 12/2004 |

OTHER PUBLICATIONS

U.S. Appl. No. 11/079,985.
U.S. Appl. No. 11/120,053.
U.S. Appl. No. 11/132,013.
U.S. Appl. No. 11/140,761.
U.S. Appl. No. 11/153,806.
U.S. Appl. No. 11/214,133.
U.S. Appl. No. 11/225,987.
U.S. Appl. No. 11/225,988.
U.S. Appl. No. 11/263,736.
U.S. Appl. No. 11/287,774.
Yutaka, Kuwata, "Multifueld Fuel-Cell Energy System for Telecommunications Cogeneration System," Iece Trans Collumn., vol. E1, B., No. 11, Nov. 1998.
Noboru Asano, "The Future of Our Fuel Cell Total Energy System," NTT Review, Mar. 1994, vol. 6, pp. 47-53.

* cited by examiner

POWER SYSTEM UTILIZING FLOW BATTERIES

CROSS-REFERENCE TO RELATED APPLICATIONS

None.

STATEMENT REGARDING FEDERALLY SPONSORED RESEARCH OR DEVELOPMENT

None.

FIELD OF THE INVENTION

In general, this invention is a reliable power system. In one embodiment, the invention is a system for providing backup DC power systems using flow batteries, e.g., polybromide-zinc energy storage systems, along with fuel cells to cover power losses.

BACKGROUND OF THE INVENTION

Traditionally, telecommunications facilities have relied on a commercial power utility as their primary source for electrical power. In the case of a sudden power loss, e.g., a blackout or other disturbance in the commercial power grid, some sort of backup system is necessary to maintain power to the telecommunications equipment.

Most facilities use a diesel generator and an array of batteries as backup power sources. Operationally, if power from the commercial utility is lost, the diesel generator is activated to supply power to the facility. It takes time for the diesel generator to come on line, though. Because of this, the battery array provides power during the time it takes to switch from the utility source to the diesel generated source. If the generator also fails (e.g., if the generator breaks down or runs out of fuel), then the battery array is able to provide power for an additional (but limited) period of time.

With respect to the batteries used, conventional systems use valve-regulated lead-acid (VRLA) batteries. These batteries have limitations. First, VRLA batteries produce harmful and corrosive gases. Thus, they require adequate ventilation. Ventilation is required by Environmental Protection Agency (EPA) standards. Second, VRLAs take up considerable space. This is because they have energy densities which are relatively low. Because of this, users normally have to dedicate large areas in the plant, and perhaps even multiple rooms, just to house them. Other limitations include that VRLAs have limited life spans and require continual maintenance. The life cycle of the VRLA is a slow death in that their charge-holding capacities become reduced over time until the battery has become unable to properly function and must be discarded.

SUMMARY OF THE INVENTION

The present invention encompasses a power system for a telecommunications facility. The system includes a flow battery included in a power supply circuit. The battery, in one embodiment, is a zinc-bromine flow battery. A fuel cell is optionally included in the circuit as an additional backup source.

BRIEF DESCRIPTION OF THE DRAWINGS

The present invention is described in detail below with reference to the attached drawing figures, wherein.

DETAILED DESCRIPTION OF THE INVENTION

The present invention, in one embodiment, works along with a power system for a telecommunications facility. The disclosed embodiment uses at least one advanced aqueous-electrolyte energy storage system (which what are commonly referred to as "flow batteries")—for backup purposes. It should be noted that the phrases "at least one" and "one or more" are used repeatedly throughout this disclosure in specifying numbers of components. It should be understood that each of these phrases when used leave open the possibility of the use of a single component, or a plurality. By using flow batteries, e.g., zinc-bromine energy storage systems, the conventional use of VRLAs is avoided, and along with that, their associated disadvantages.

Advanced aqueous-electrolyte energy storage systems are very different functionally from more traditional batteries. They use a circulation system to feed flowing electrolyte from external reservoirs into battery stacks. The stacks consist of bipolar electrodes. The positive and negative electrodes are parsed by a microporous separator.

For the zinc-bromine energy storage system, the arrangement above allows the negative zinc reaction to occur on one side of the electrode and the positive bromine reaction to occur on the other. When in charging mode, bromine is evolved at the cathode while zinc is electroplated onto the anode. Reactivity and vapor pressure in the elemental bromine are reduced using a complexing agent to form a polybromide complex. This keeps the electrolyte from discharging. Once complexed, the bromine is removed from the electrode stacks in the flowing electrolyte and is stored in a separate reservoir.

When the energy storage system is in discharge mode, the complexed bromine is flowed back from the reservoir into the stacks. The bromine is then reduced to bromide ions on the cathode, and the zinc is oxidized to form zinc ions at the anode. Thus, DC power is produced which is able to be exploited according to the disclosed embodiments.

Zinc-bromine energy storage systems (flow batteries) have been known in the art for a considerable amount of time. See, e.g., U.S. Pat. Nos. 6,455,187 and 312,802. Further, the scalable Zinc-Flow® storage system which has been proposed for use in the present invention is commercially available from Premium Power Corporation in North Andover, Mass.

Figure 1:
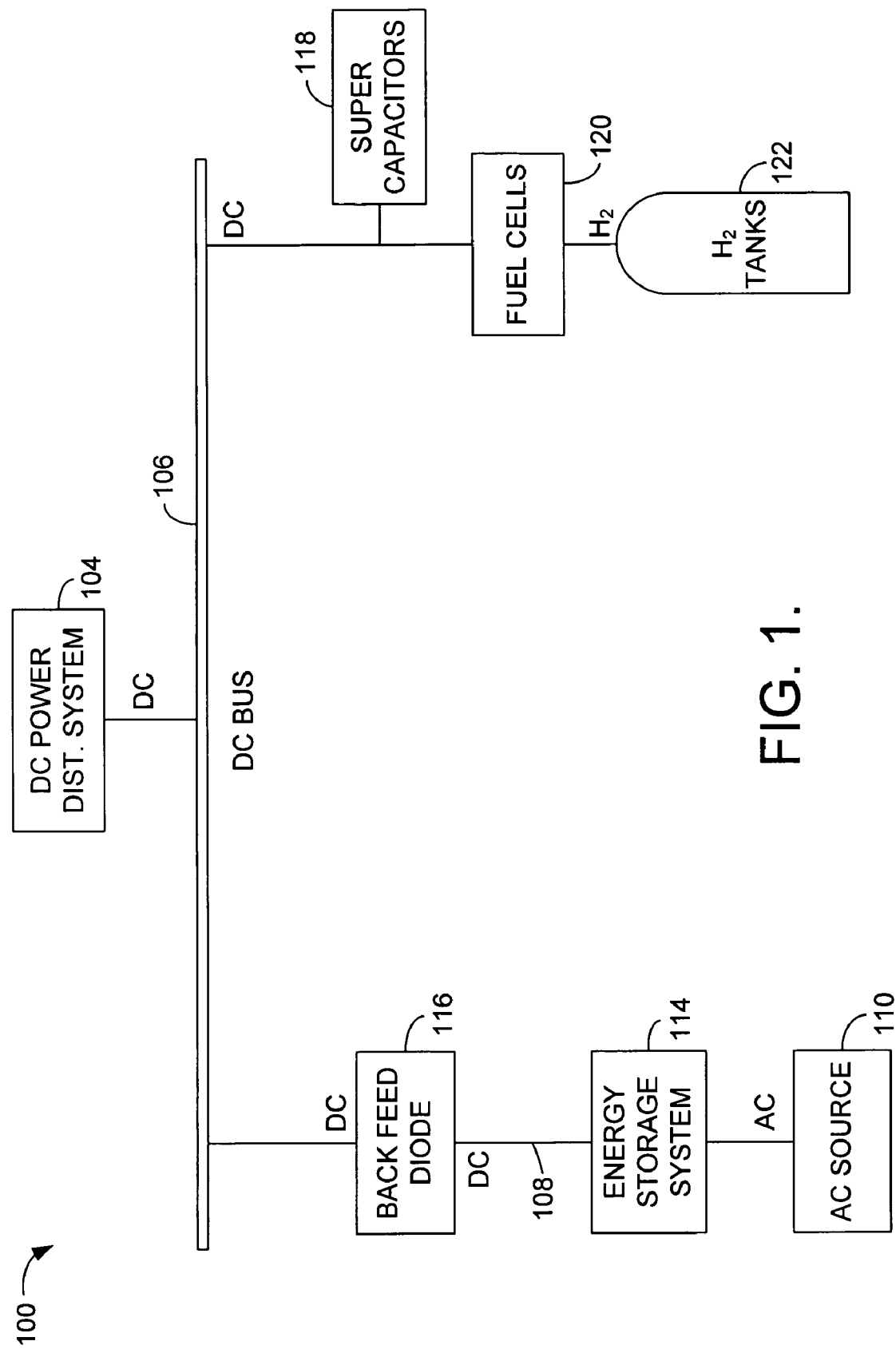
FIG. 1 is a schematic diagram showing one embodiment of the system of the present invention.
Figure 2:
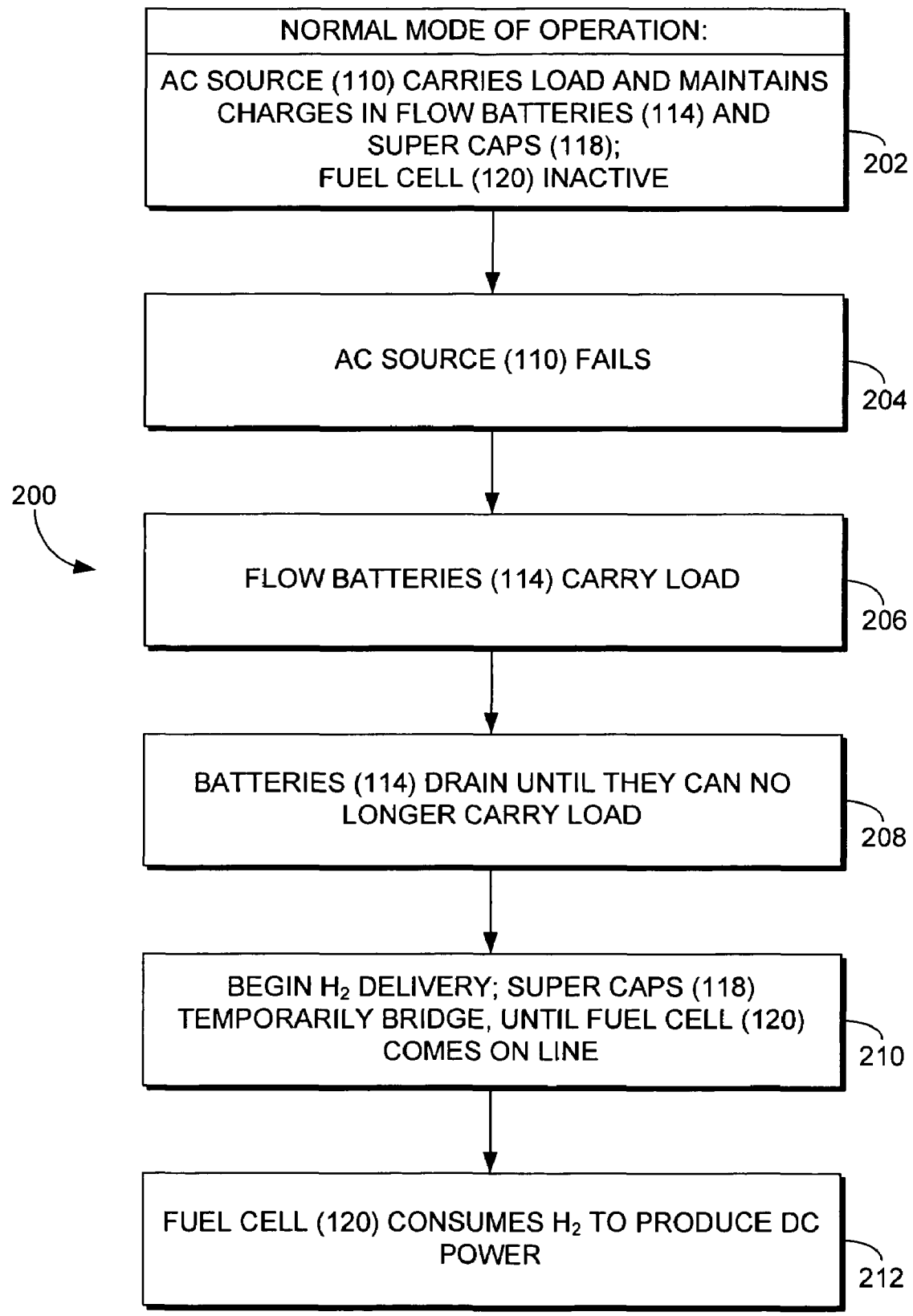
FIG. 2 is a flow diagram showing the backup-power-management processes of the present invention.

The present invention is best understood in connection with the schematic diagram of FIG. 1 and the flow diagram of FIG. 2. Referring first to FIG. 1, a schematic 100 shows the components of one embodiment for a novel power system.

An important objective in a typical telecommunications facility is to maintain DC power to one or more DC power distribution units (PDUs) 104. The PDUs supply power to telecommunications equipment (e.g., routers, switches, servers). To do this, each PDU 104 is included on a DC bus 106. It is important that DC power is maintained to bus 106 so that the facilities telecommunications equipment remains functional at all times. In the preferred embodiment, five PDUs in the facility have individual requirements of 400 A; 48V DC each. This makes the minimum total power requirements of the bus 2000 A, 48V DC (100 KW). In the preferred embodiment, however, 54V DC is maintained at bus 106 in order to avoid any adverse effect of small voltage dips. The broad concepts of the present invention could, of course, be employed for the purpose of meeting other requirements, larger or smaller.

In the disclosed embodiment, the primary source of DC power is received from an AC power source 110. Normally, source 110 will be a commercial utility. The AC provided must be converted to DC power using at least one conversion device 112 (most likely a plurality of conversion devices). Once converted, the DC power is presented into a circuit 108. In the disclosed embodiment, devices 112 are rectifiers.

Also included in parallel in circuit 108 are one or more advanced aqueous-electrolyte energy storage systems a/k/a flow batteries 114, as have already been described and discussed above. Oftentimes, some sort of AC to DC conversion arrangement will be included along with the energy storage device 114 as it is available from the manufacturer. In the preferred embodiment, 480V 3 phase electrical utility power from source 110 is connected directly into system 114. System 114 includes a high-voltage Insulated Gate Bipolar Transistor (IGBT) with a 54VDC output. In other cases, an inverter or rectifier arrangement may be separately utilized and supplied.

In the preferred embodiment, the particular storage system selected is identified as a PowerBlock 150® which is derived from the Zinc-Flow® line available from Premium Power Corporation. Suitable other storage systems are likely available form alternative sources. These advanced aqueous-electrolyte a/k/a zinc-bromine flow batteries 114 use polybromide complexes. Alternatively, these batteries are sometimes also referred to as "polybromide-zinc" batteries.

It is possible that numerous other kinds of energy storage systems could be used instead and still fall within the scope of the present invention. For example, zinc-chlorine hydrate batteries are another advanced aqueous-electrolyte system which might be used instead. Redox flow batteries might also be used. For example, vanadium redox flow batteries (VRBs), zinc-alkaline-sodium-ferricyanide redox, or iron-chromium redox batteries are all possible alternatives. Another possibility might be refuelable metal air batteries. Further examples exist.

Energy storage system 114 will serve to maintain DC power to bus 106 in the event AC source 110 fails, e.g., in the event of a temporary power loss.

The number of flow batteries selected will depend on the power demands for the facility or other site. In the preferred embodiment, the energy storage system 114 comprises parallel sets of 3 polymer electrode stacks, each in series in order to maintain 2000 A, 54V DC (100 KW) in bus 106. The specific electrolyte used includes zinc bromide, potassium chloride, hydrochloric acid, and water. The number, arrangement, sizes, and other characteristics of energy storage system 114 could be easily conformed to meet greater or smaller requirements.

Between energy storage system 114, AC source 110, and DC bus 106 in circuit 108 is a back-feed diode 116. Back-feed diode 116 allows the flow of current in only one direction—from circuit 108 into bus 106. This prevents power from other locations in schematic 100 from being dissipated into circuit 108 (e.g., recharging flow batteries 114) when power to bus 106 is being maintained by capacitors 118, fuel cells 120, or some other source after the AC source 110 and flow batteries 114 have both failed. By preventing power from feeding back into circuit 108, the capacitors and fuel cell are able to fully supply bus 106.

Once the flow batteries lose charge, at least one fuel cell 120 exists as an additional backup device. Fuel cells are electrochemical-energy-conversion devices. They utilize hydrogen and oxygen. Proton exchange membranes (PEMs) or other equivalent devices, in fuel cells cause the electron from hydrogen to be removed temporarily. Later, this hydrogen electron is returned when the hydrogen is combined with the oxygen to produce water. This creates electricity. The reaction is entirely noncombustive, and generates DC electrical power. Because the only by products of this reaction are heat, water, and electricity, a fuel cell is friendly to the environment. In addition, a fuel cell is capable of providing electrical power for as long as hydrogen fuel is supplied to the unit. It does not discharge over time like a battery.

In the preferred embodiment disclosed in FIG. 1, each of fuel cells 120 include a plurality of PEMs. Hydrogen fuel is delivered to these membranes in fuel cell 120 via a hydrogen conduit from at least one, but more likely a plurality of pressurized hydrogen tanks 46. In the preferred embodiment, ten 200 A, 54V (10 KW) fuel cells are included into the DC bus in parallel. The minimum specifications, however, would be only 48V to meet the minimum requirements. The additional voltage rating is intended to cover voltage drops. The fuel cells are split into two groups of five. Each group of five fuel cells is supplied by a plurality of typical bumpstop "T" bottles (48 in the preferred embodiment). These gaseous hydrogen storage devices are commercially available. One example of a PEM-type fuel cell which is suitable for use with the present invention is the 10 KW, 54V proton exchange membrane manufactured by Hydrogenics of Ontario, Canada.

Though fuel cell 120 used in the preferred embodiment has been shown and described herein as using PEMs, other fuel-cell technologies exist which might be used instead and still fall within the scope of the present invention.

FIG. 1 also shows the inclusion of at least one capacitor 118 into DC bus 106. In the preferred embodiment a plurality of supercapacitors (ten total) are used. Supercapacitors like those used here are commercially available. Each capacitor is electrically coupled with the output of one of the ten fuel cells. The capacitors are continuously charged so long as there is an active source of power. Thus, if any of AC source 110, flow batteries 114, or fuel cell 120 are operational, DC electricity will be supplied to bus 134 and this will maintain a charge in capacitors 118.

This stored charge in the capacitors is used for bridging purposes. Primarily during the startup of the fuel cells 120. It takes about 14 seconds for the fuel cells to come online to the point that they are consuming hydrogen and generating DC power to the extent that they can meet the bus load requirements. The capacitors 118 are capable of handling the down time which occurs with either of these situations. Thus, the fuel cell start up delay is bridged by capacitors 118.

Though not shown, one skilled in the art will recognize that the power system of the present invention necessarily comprises a control system which includes a number of sensing and control mechanisms (not shown) for determining when fuel cells 120 need be activated. One advantage of the system disclosed in FIG. 1 is that most of its backup power sources, e.g., flow batteries 114, capacitors 118, are always on line and do not need any activation. The fuel cells, however, must be activated using the control system. One way in which the control system can be set up to recognize the need for fuel cell activation is to locate a voltage sensor in circuit 108. When this sensor detects voltages falling below the 48VDC requirements, the control system will open up automated valves (not shown) between the tanks 122 and the fuel cells 120 so that the hydrogen can be delivered for consumption.

The voltage monitoring, the opening of the automated valves to cause activation of the fuel cells, and the closing of the valves when the fuel cell is no longer needed, are all managed, in the preferred embodiment, using one or more programmable logic controllers (PLCs). Other automated arrangements could be used as well, however, and still fall within the scope of the present invention. One skilled in the art will recognize that automated systems may be separate devices, or may be integral to the valves, bus lines, and/or devices being monitored. Likewise, the control mechanisms may be separate devices, such as programmable logic controllers used in the preferred embodiment, or may be integrated into the components already described. The control arrangement is not critical to the broad concepts of the invention.

A power-management flow chart 200 of FIG. 2 shows different contingency plans in the event that the primary power source (AC source 110), and possibly secondary power sources, are inoperable for some reason.

As a preliminary measure, a step 202 assumes the components of the system have already been set in place, the AC power source is available and has already charged flow batteries 114 and the capacitors 118, and the system is in its normal mode of operation. In normal mode, AC source 110 carries the load for the facility. At the same time, it will continually charge flow batteries 114 and the capacitors 118 so that charges are maintained in these devices. The fuel cells 120 are inactive in normal mode.

If, however, the AC source fails as shown in a next step 204, the flow batteries will carry the load as shown in a step 206. This will continue for a considerable amount of time, depending on the specifications and number of flow batteries selected for inclusion in the system.

Once the flow batteries have drained to the point they can no longer carry the load requirements of the DC bus, as shown in a step 208, the control system will recognize this and start up the fuel cells in a next step 210. In step 210, the control system will open up the automated valves and begin hydrogen delivery from tanks 120 to fuel cells 120. As noted above, there is a delay between the time the control system detects a need and the fuel cells become active. To bridge this down time, capacitors 118 will temporarily bridge so that power to DC bus 106 is not temporarily lost before fuel cells 120 come on line.

Once the hydrogen is delivered, fuel cells 120 will consume it to produce DC power in a step 212. The fuel cell will continue to receive hydrogen until AC source 120 becomes available again.

It should be noted that if at any point in the FIG. 2 process AC source 110 becomes available, hydrogen delivery to the fuel cells will be terminated, and the system will automatically revert to the normal mode of operation disclosed in step 202.

It will be appreciated by persons skilled in the art that the present invention is not limited to what has been particularly shown and described above. Rather, all matter shown in the accompanying drawings or described above is to be interpreted as illustrative and not limiting. Accordingly, the scope of the present invention is defined by the appended claims rather than the foregoing description.

What is claimed is:

1. A system for maintaining DC power to a circuit comprising:
   a conversion device adapted to accept AC power from an AC source and convert said AC power into a primary source of DC power to said circuit in normal mode;
   an energy storage device adapted to charge and discharge upon the circulation of a flowable electrolyte through an electrode, said device being included in said circuit as a secondary source of DC power for said circuit, wherein the AC source is connected directly into, and continually charges in normal mode, the energy storage device, and wherein the energy storage device is configured to be persistently on line, thereby automatically discharging to a DC bus when the AC source fails without activation;
   a back feed diode that restricts flow from the circuit to the DC bus that presents DC power to facilities telecommunications equipment, thereby preventing dissipation of DC power from the DC bus to the circuit;
   a fuel cell that provides DC power to the DC bus in parallel with the circuit when the AC source and the energy storage device can no longer carry load requirements of the DC bus; and
   a control system to open automated valves that deliver hydrogen from a tank to the fuel cell upon recognizing that the energy storage device has drained below load requirements of the DC bus.

2. The system of claim 1 wherein the DC bus includes a capacitor which is adapted to bridge during delays in start up of the fuel cell.

3. The system of claim 1 wherein the back feed diode is located between said energy storage device and said fuel cell.

4. The system of claim 1 wherein said back feed diode being located between said capacitor and said energy storage device.

5. The system of claim 1 wherein said fuel cell comprises at least one proton exchange membrane (PEM).

6. The system of claim 1 wherein said energy storage device is a zinc-energy storage system.

7. The system of claim 6 wherein said zinc-bromine energy storage system uses polybromide complexes.

8. A power supply comprising:
   a utility-provided primary source of power for at least one power-consuming device in normal mode, wherein the primary source or power provides AC power to a conversion device that converts the AC power to a primary source of DC power which is presented to a circuit;
   an advanced aqueous-electrolyte energy storage system for providing a secondary source of DC power to backup said power-consuming device wherein the AC source is connected directly into, and continually charges in normal mode, the energy storage system, and wherein the energy storage system is configured to be persistently on line, thereby automatically discharging to the circuit when the primary source fails without activation;
   fuel cells for providing an alternative additional source of backup power when the primary source of power and the energy storage system can no longer carry load requirements of said device; and
   a back feed diode that restricts flow from the circuit to the device, thereby preventing dissipation of DC power from the device and the fuel cells to the circuit; and
   a control system to open automated valves that deliver hydrogen from a tank to the fuel cells upon recognizing that the energy storage system has drained below load requirements of the power-consuming device.

9. The power supply of claim 8 including capacitors that perform a bridge function during delays in start up of the fuel cells, wherein each of the capacitors is electrically coupled with an output of one of the fuel cells, and wherein the capacitors are continuously charged when any one of the primary source of power, the energy storage system, or the fuel cells are operational.

10. The power supply of claim 9 wherein the back feed diode is interposed between said energy storage system and said capacitors.

11. The power supply of claim 8 wherein said fuel cells comprise at least one proton exchange membrane (PEM).

12. The power supply of claim 8 wherein said energy storage system is a zinc-bromine flow energy storage system.

13. The power supply of claim 12 wherein said zinc-bromine flow energy storage system uses polybromide complexes.

14. The power supply of claim 8 wherein said conversion device is an Insulated Gate Bipolar Transistor (IGTB).

15. The power supply of claim 14 wherein said IGTB is included in said energy storage system.

16. A method of supplying power comprising:
converting AC power provided from a first source to DC power for carrying a load of a power-consuming device in normal mode, wherein the first source comprises an AC utility;
using an advanced aqueous-electrolyte energy storage system as a second source of DC power for said power-consuming device in the event said first source is unavailable, wherein the AC source is connected directly into, and continually charges in normal mode, the energy storage system, and wherein the energy storage system is configured to be persistently on line, thereby automatically discharging to a DC bus when the primary source fails without activation;
providing a back feed diode that restricts flow from the circuit to the DC bus that presents DC power to the power-consuming device; and
providing a fuel cell in connection with the DC bus to provide an alternative third source of DC power for said power-consuming device in the event said first and second sources of DC power are both unavailable; and
providing a control system to open automated valves that deliver hydrogen from a tank to the fuel cell upon recognizing that the energy storage system has drained below load requirements of the power-consuming device.

17. The method of claim 16, wherein the back diode prevents loss of electrical power back into said energy storage system in the event said fuel cell is activated.

18. The method of claim 16 further comprising:
providing a capacitor to temporarily maintain power to said device in the event said first and second sources are unavailable and said fuel cell has not yet become operational.

19. The method of claim 16 further comprising:
using an IGBT to accomplish said converting step.

* * * * *